US010646885B2

(12) United States Patent
Ingram et al.

(10) Patent No.: US 10,646,885 B2
(45) Date of Patent: May 12, 2020

(54) CENTRIFUGAL GAS SEPARATOR

(71) Applicant: ETEROS TECHNOLOGIES INC., Surrey (CA)

(72) Inventors: Erik Ingram, Abbotsford (CA); Rudi Klossok, Coquitlam (CA); Joe Heywood, New Westminster (CA)

(73) Assignee: Eteros Technologies Inc., Surrey (CA)

( * ) Notice: Subject to any disclaimer, the term of this patent is extended or adjusted under 35 U.S.C. 154(b) by 123 days.

(21) Appl. No.: 15/635,955

(22) Filed: Jun. 28, 2017

(65) Prior Publication Data
US 2019/0001348 A1    Jan. 3, 2019

(51) Int. Cl.
| | | |
|---|---|---|
| *B01D 45/12* | (2006.01) | |
| *B04C 3/06* | (2006.01) | |
| *B01D 45/16* | (2006.01) | |
| *B04C 5/04* | (2006.01) | |
| *B04C 5/13* | (2006.01) | |

(Continued)

(52) U.S. Cl.
CPC ............... *B04C 3/06* (2013.01); *B01D 45/12* (2013.01); *B01D 45/16* (2013.01); *A47L 9/1683* (2013.01); *B04C 5/04* (2013.01); *B04C 5/13* (2013.01); *B04C 2003/006* (2013.01)

(58) Field of Classification Search
CPC ....... B04C 3/06; B04C 2003/006; B04C 5/04; B04C 5/13; B01D 45/12; B01D 45/16; A47L 9/1683
See application file for complete search history.

(56) References Cited

U.S. PATENT DOCUMENTS 1,845,358 A * 2/1932 Stebbins .................. B07B 7/08
                                                209/712
2,153,270 A * 4/1939 Osgood .................... B04C 5/12
                                                55/298

(Continued)

FOREIGN PATENT DOCUMENTS

| GB | 792230 A | 3/1958 | |
|---|---|---|---|
| JP | 09201506 A * | 8/1997 | ............ B01D 45/12 |
| WO | WO-2014183209 | 11/2014 | |

OTHER PUBLICATIONS

"International Application No. PCT/CA2018/000114, International Search Report and Written Opinion dated Aug. 10, 2018", (Aug. 10, 2018), 7pgs.

(Continued)

*Primary Examiner* — Dung H Bui
(74) *Attorney, Agent, or Firm* — Schwegman Lundberg & Woessner, P.A.

(57) ABSTRACT

A centrifugal gas separator includes a separation chamber defined by a peripheral wall spaced apart from, extending around a central axis of and extending axially between opposite ends of the chamber. A peripheral intake port co-operates with the peripheral wall to introduce a rotating flow of a gaseous intake stream comprising a gas component and a non-gas component along an inside surface of the peripheral wall. A peripheral exhaust port defined through the peripheral wall diverts a radially outermost portion of the rotating flow, including at least some of the non-gas component, to exit the chamber. A gas component output port is configured to allow the gas component to be drawn from an axially central volume of the separation chamber.

21 Claims, 7 Drawing Sheets

(51) Int. Cl.
*A47L 9/16* (2006.01)
*B04C 3/00* (2006.01)

(56) References Cited

U.S. PATENT DOCUMENTS

| | | | | | |
|---|---|---|---|---|---|
| 2,439,850 | A | * | 4/1948 | Heller | B04C 5/28 55/347 |
| 2,634,808 | A | * | 4/1953 | Arnold | B01D 1/18 122/48 |
| 2,796,949 | A | * | 6/1957 | Schneider | B04C 5/081 55/460 |
| 2,887,178 | A | * | 5/1959 | Wallin | B04C 5/103 55/412 |
| 3,264,805 | A | * | 8/1966 | Tyler | B01D 45/12 261/116 |
| 3,672,503 | A | * | 6/1972 | Mark | B04C 1/00 156/62.8 |
| 4,001,121 | A | * | 1/1977 | Bielefeldt | B01D 45/14 209/722 |
| 4,108,778 | A | * | 8/1978 | Lambert | B01D 33/073 210/297 |
| 4,397,741 | A | * | 8/1983 | Miller | B03D 1/1425 209/170 |
| 4,424,069 | A | * | 1/1984 | Chang | B01D 45/12 261/124 |
| 5,180,486 | A | * | 1/1993 | Smolensky | B01D 45/12 210/195.1 |
| 5,236,479 | A | * | 8/1993 | Billingsley | B01D 45/12 55/337 |
| 5,591,253 | A | * | 1/1997 | Altman | B01D 45/16 55/460 |
| 5,681,450 | A | * | 10/1997 | Chitnis | B01J 8/0055 208/100 |
| 5,683,494 | A | * | 11/1997 | Altman | B01D 45/16 55/460 |
| 6,110,242 | A | * | 8/2000 | Young | B01D 45/12 209/139.2 |
| 6,125,826 | A | * | 10/2000 | Brocard | B01D 29/115 123/510 |
| 6,530,484 | B1 | * | 3/2003 | Bosman | B01D 21/2416 209/732 |
| 9,446,915 | B2 | * | 9/2016 | Sundholm | B65G 53/60 |
| D800,979 | S | | 10/2017 | Ingram | |
| 2002/0189451 | A1 | * | 12/2002 | Morgan | A47L 9/1683 95/268 |
| 2004/0031391 | A1 | * | 2/2004 | Grimm | A61C 17/046 96/209 |
| 2008/0060522 | A1 | * | 3/2008 | Bertuccioli | B03C 3/017 96/55 |
| 2008/0209669 | A1 | | 9/2008 | Kah | |
| 2009/0101009 | A1 | * | 4/2009 | Khalil | B01D 53/10 95/58 |
| 2010/0200521 | A1 | * | 8/2010 | Sarshar | B04C 3/00 210/787 |
| 2011/0252968 | A1 | * | 10/2011 | M?kinen | B01D 45/08 95/267 |
| 2014/0165513 | A1 | * | 6/2014 | Oelpke | F02M 35/0216 55/385.1 |
| 2014/0216264 | A1 | * | 8/2014 | Hsiau | B01D 46/34 96/373 |
| 2016/0281010 | A1 | * | 9/2016 | Brem | B01J 8/14 |
| 2019/0009282 | A1 | * | 1/2019 | Damkj r | B04C 5/04 |

OTHER PUBLICATIONS

"Cyclonic Separation", Wikipedia, Jun. 21, 2017, https://en.wikipedia.org/w/index.php?title=Cyclonic_separation&oldid=786777360, (Jun. 21, 2017), 6 pgs.

Thien, J. Phil, "The Thien Cyclone Separator Lid w/ the Thien Cyclone Separator Baffle", Jan. 21, 2013, as downloaded from http://www.jpthien.com/cy.htm on Nov. 23, 2017, (Jan. 21, 2013), 2 pgs.

* cited by examiner

CENTRIFUGAL GAS SEPARATOR

FIELD OF THE INVENTION

The present invention relates to centrifugal gas separators, for separating the gas and non-gas components of a gaseous stream.

BACKGROUND OF THE INVENTION

Centrifugal gas separators are well known and are used in many different settings, to remove solids or liquids from air or from another gaseous intake stream. For example, in woodworking shops or sawmills, centrifugal gas separators are often used to remove sawdust and other airborne particles from the air in the work environment. Likewise, in certain agricultural applications such as the harvesting of hops for beer production or the harvesting of medical marijuana, a vacuum may be used to suck loose leaf material through openings in a tumbler, and a centrifugal gas separator may be used to remove the extracted leaf material from the air.

The two most common forms of conventional centrifugal gas separators are cyclonic separators and Thien separators.

A typical cyclonic separator consists of a vertical cylinder mounted above a vertical conical frustum ("cone"). The diameter of the cone is equal to that of the cylinder where they are joined, but progressively narrows as it descends downward from the cylinder, terminating at a circular opening at the bottom. A horizontal air intake near the top of the cylinder introduces a flow of dust-bearing air into the cylinder, in a direction generally tangential to the outer wall of the cylinder. The inside surface of the cylinder causes the incoming flow of dust-bearing air to rotate around the inside of the cylinder, as a result of which centrifugal force causes the dust particles to travel radially outward to the cylinder wall as they rotate around the cylinder. Gravity gradually pulls the rotating dust particles down into the cone, and they gradually descend to eventually exit through the bottom of the cone and into a collection receptacle. The cylinder has a disc-shaped top plate having a clean air opening surrounding the central axis of the cylinder. The clean air opening draws air out from an axially central volume of the top region of the cylinder. The rotation of the dust-bearing air in the cylinder forces the dust particles radially outward and gravity pulls the dust particles axially downward, so the air being drawn from the top central axial volume of the cylinder is generally free of dust, or at least is generally free of dust particles larger than the "cut point" of the separator, which defines the size of particle that will be removed from the stream with 50% efficiency.

A Thien separator is somewhat similar, insofar as it includes a vertical cylinder, an intake to direct a tangential flow of dust-bearing air to rotate around the inside wall of the cylinder, and a clean air opening defined through an axially central opening in a disc-shaped top plate of the cylinder. The Thien separator lacks the conical frustum section of the cyclonic separator. Instead, a disc-shaped bottom plate of the cylinder has a C-shaped or crescent-shaped aperture near the outer periphery of the disc. Dust-bearing air is introduced through the intake to rotate around the inside of the cylinder, and the resulting centrifugal force pushes the dust radially outward against the cylinder wall as it rotates. Gravity gradually pulls the dust particles downward as they rotate around the inside of the cylinder wall, until the dust particles eventually pass downward through the C-shaped aperture and into a collection receptacle.

The present inventors have perceived a number of disadvantages with conventional centrifugal gas separators.

For example, both Thien separators and the basic forms of cyclonic separators can only operate in a vertical orientation, because they require the force of gravity to cause the dust particles to exit from the separator. Although some manufacturers now offer complex solutions involving numerous additional components and additional airflow injections to allow horizontal operation of cyclonic separators, the added cost, complexity, energy consumption and maintenance demands of these additional components create new disadvantages which offset their capacity for horizontal operation.

Cyclonic separators are also very space-consuming. In their basic vertical form they are typically at least as tall as an adult person, and in their more complex horizontal form they tend to be even larger, though horizontally oriented.

Both cyclonic and Thien separators typically require many rotations of the dust-bearing air inside the cylinder before the dust is eventually separated. This long dwell-time is in itself disadvantageous, and also results in the further disadvantage that it is not difficult to saturate or overload cyclonic and Thien separators by introducing particulate material at a faster rate than it can be removed.

SUMMARY OF THE INVENTION

In one illustrative embodiment, a centrifugal gas separator for separating gas and non-gas components of a gaseous stream includes a centrifugal separation chamber defined by a peripheral wall spaced apart from and extending around a central axis of the chamber and extending axially between spaced apart opposite ends of the chamber. The separator further includes a peripheral intake port configured to cooperate with the peripheral wall to introduce a rotating flow of a gaseous intake stream including a gas component and a non-gas component along an inside surface of the peripheral wall. The separator further includes a peripheral exhaust port defined through the peripheral wall, configured to divert a radially outermost portion of the rotating flow, including at least some of the non-gas component, to exit the chamber. The separator further includes a gas component output port configured to allow the gas component to be drawn from an axially central volume of the separation chamber.

The present inventors have found that such a separator provides numerous advantages over conventional centrifugal gas separators such as Thien and cyclonic separators.

One particularly important advantage flows from the different principle of operation of the presently disclosed separator: unlike the Thien and cyclonic separators which require airborne solids to exit the separator by travelling in the axial direction, the separator of the above-described embodiment instead allows airborne solids to exit the separator by simply travelling in the tangential direction of their rotation. The Thien and cyclonic separators require an induced motion other than their rotation to cause the airborne solids to exit the separator axially, and thus rely on gravity (or a secondary injected airflow in the case of a horizontal cyclonic separator) to induce a gradual axial settling of the solids. Consequently, Thien and cyclonic separators typically require the solids to undergo numerous rotations around the inside of the separator before they finally settle and exit. In contrast, a separator of the above-described embodiment does not require the solids to undergo any axial movement, and more generally, does not require the solids to undergo any induced motion other than their rotation around the inside of the separation chamber. Instead, the peripheral exhaust port defined through the peripheral wall advantageously diverts a radially outermost portion of the rotating flow, including at least some of the solids, to exit the chamber, thus allowing the solids to exit the separation chamber as a result of only their rotational motion around the chamber. Consequently, a separator of the present embodiment tends to have a significantly faster solids settling time than conventional Thien or cyclonic separators: advantageously, the present inventors have found that most solids tend to be removed in the first or second rotation around the separation chamber, whereas larger numbers of rotations are required for settling in Thien and cyclonic separators.

The faster settling time also advantageously reduces the susceptibility of the separator to overloading or saturation. Due to their comparatively slower settling times, it is not difficult to overload or saturate a Thien or cyclonic separator, by feeding in solids at a faster rate than they can settle. In contrast, the present inventors have tested an embodiment of the above-described separator in an extreme trial involving solids concentrations unlikely to be encountered in practice, by dumping an entire large bucket of plant-based dust and solids into the separator, and have found that the separator can easily remove the solids without overloading or clogging. The above-described separator therefore tends to be capable of handling significantly higher concentrations of solids than conventional Thien and cyclonic separators.

The above-described separator also tends to provide other advantages over conventional separators. In comparison to cyclonic separators for example, the above-described separator tends to be considerably smaller, less expensive, less complex, easier to clean and maintain, and more easily tunable to different particle sizes by modifying the sizes of the intake and exhaust ports. In comparison to Thien separators, the above-described separator also tends to be easier to clean and maintain. Embodiments of the above-described separator also typically involve a lower static pressure drop than Thien separators, and a comparable or lower static pressure drop than cyclonic separators, thereby tending to achieve greater energy efficiency and higher volumetric flow rates.

In illustrative embodiments, the peripheral exhaust port may include a tangential exhaust port configured to divert the radially outermost portion of the rotating flow to exit the chamber in a direction tangential to the rotating flow at a location of the tangential exhaust port.

In illustrative embodiments, the peripheral wall may be cylindrical, and the peripheral intake port may be defined through the peripheral wall.

In another illustrative embodiment, a centrifugal gas separation method includes introducing a rotating flow of a gaseous intake stream including a gas component and a non-gas component along an inside surface of a peripheral wall of a centrifugal separation chamber, through a peripheral intake port, the peripheral wall extending around a central axis of the chamber and extending axially between opposite ends of the chamber. The method further includes diverting a radially outermost portion of the rotating flow, including at least some of the non-gas component, to exit the chamber through a peripheral exhaust port defined through the peripheral wall of the chamber. The method further includes allowing the gas component to be drawn from an axially central volume of the separation chamber.

In another illustrative embodiment, a centrifugal gas separator includes means for introducing a rotating flow of a gaseous intake stream including a gas component and a non-gas component along an inside surface of a peripheral wall of a centrifugal separation chamber, the peripheral wall extending around a central axis of the chamber and extending axially between opposite ends of the chamber. The separator further includes means for diverting a radially outermost portion of the rotating flow, including at least some of the non-gas-component, to exit the chamber through the peripheral wall of the chamber. The separator further includes means for allowing the gas component to be drawn from an axially central volume of the separation chamber.

Other aspects, features and advantages of illustrative embodiments of the present invention will become apparent to those ordinarily skilled in the art upon review of the following description of such embodiments in conjunction with the accompanying figures.

BRIEF DESCRIPTION OF THE DRAWINGS

In drawings which illustrate embodiments of the invention.

DETAILED DESCRIPTION

Overview

Figure 1:
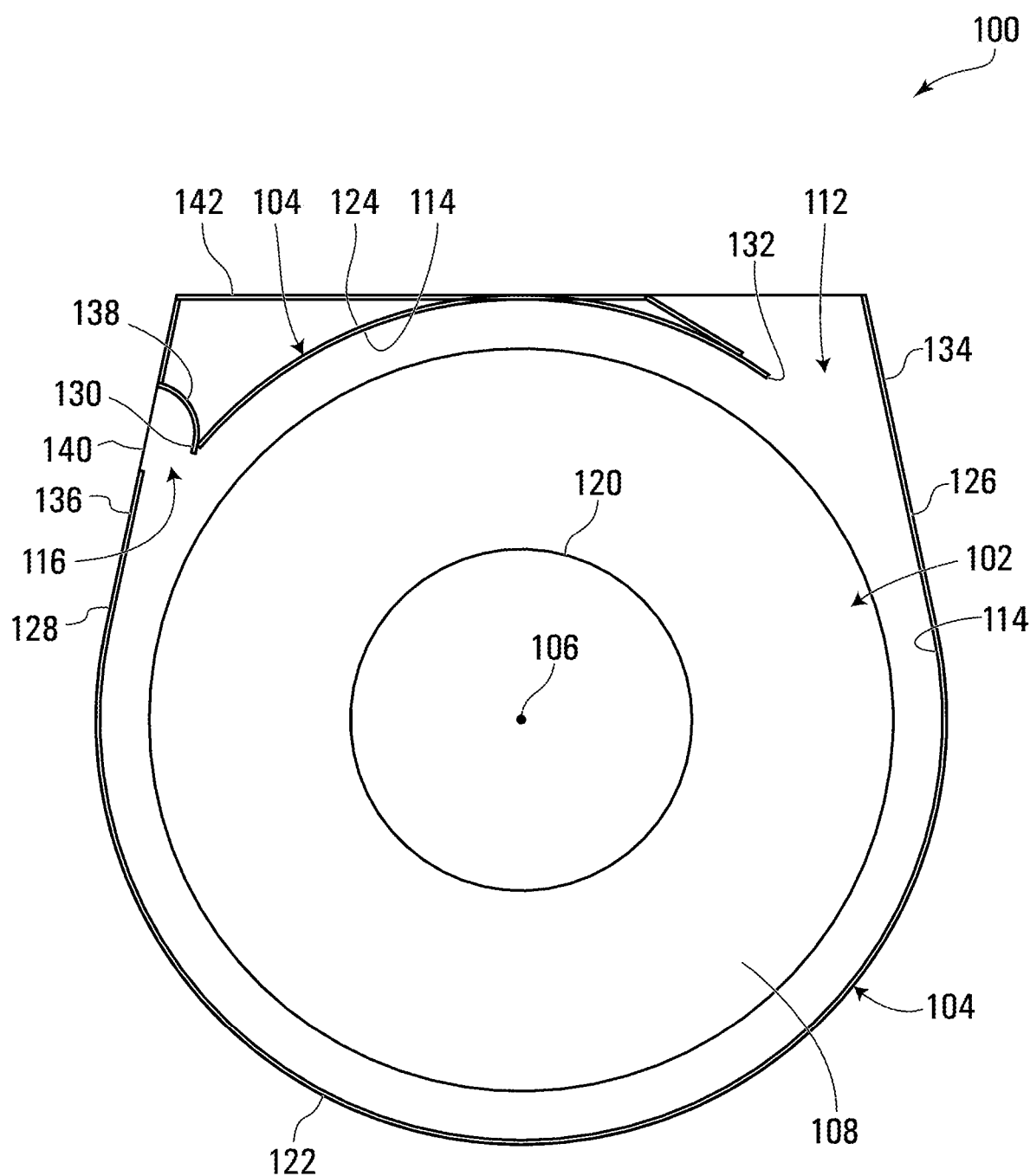
FIG. 1 is a right-side elevation view of a centrifugal gas separator according to a first embodiment, with a right sidewall removed.
Figure 2:
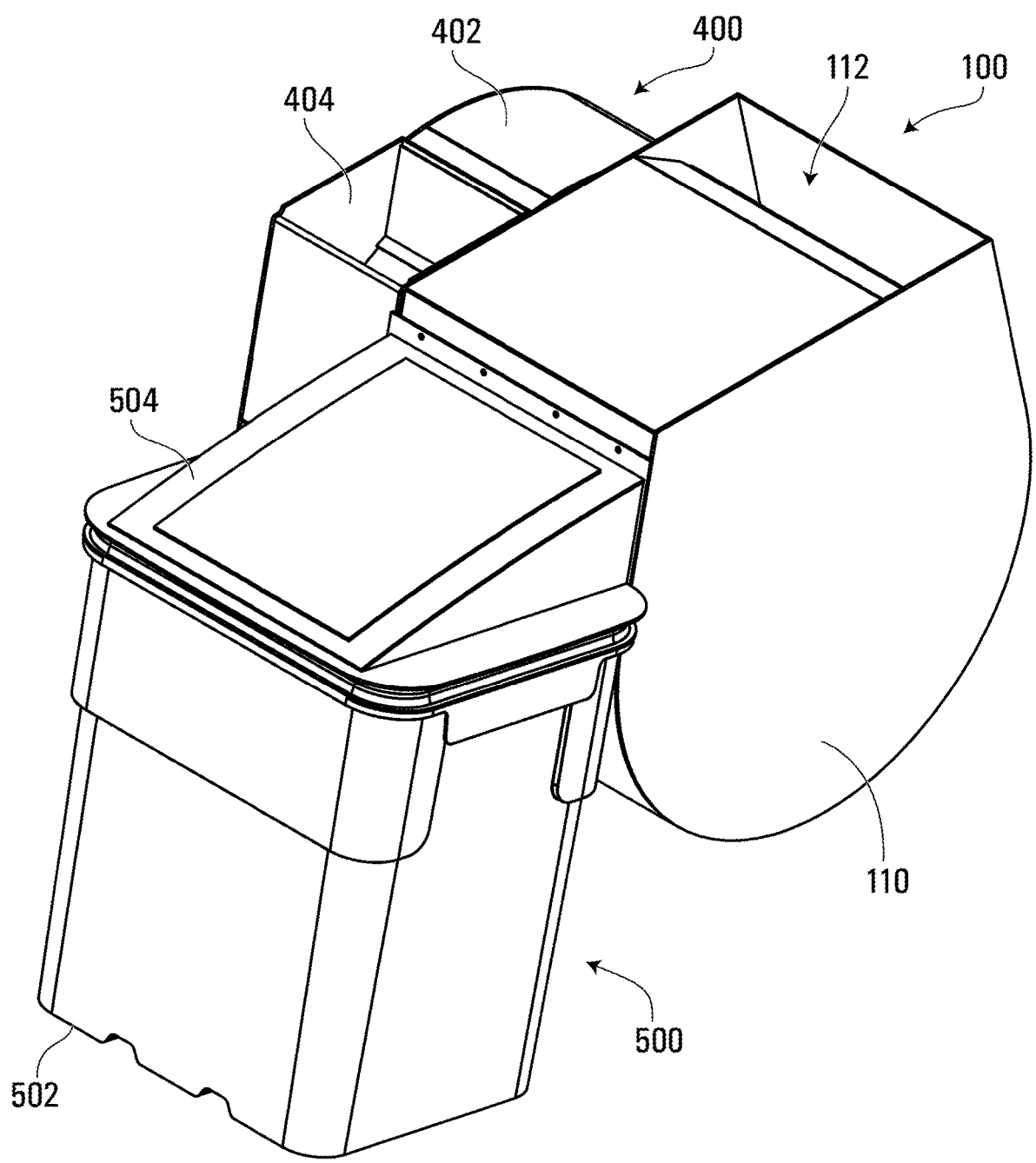
FIG. 2 is an isometric view of a centrifugal gas separator of FIG. 1, shown with a collection receptacle and a vacuum.
Figure 3:
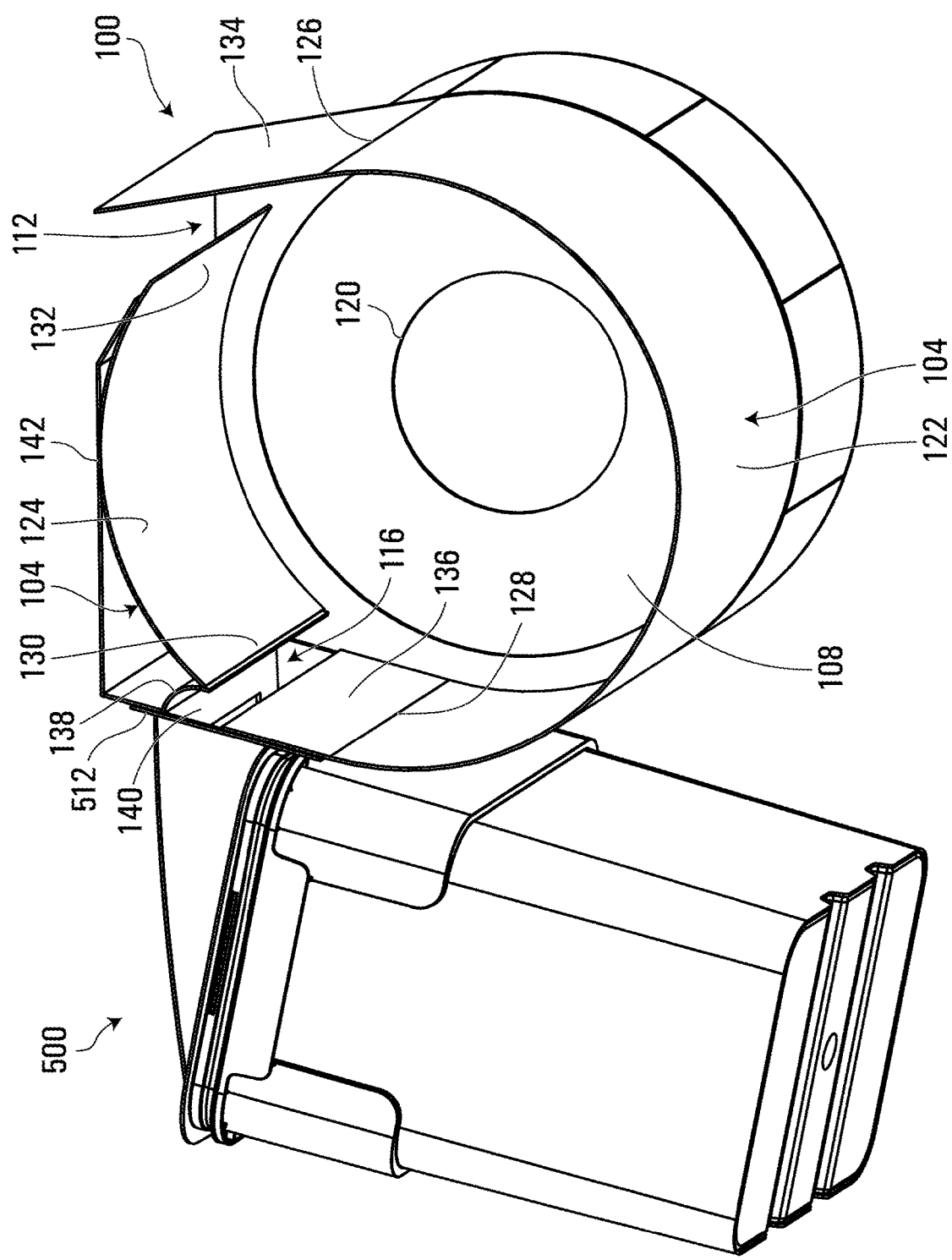
FIG. 3 is an inclined right-side view of the separator, receptacle and vacuum of FIG. 2, with a right sidewall of the separator removed.

Referring to FIGS. 1-3, a centrifugal gas separator for separating gas and non-gas components of a gaseous stream is shown generally at 100. In this embodiment, the separator 100 includes a centrifugal separation chamber 102 defined by a peripheral wall 104 spaced apart from and extending around a central axis 106 of the chamber, the peripheral wall extending axially between spaced apart opposite ends 108 and 110 of the chamber.

In this embodiment, the separator 100 further includes a peripheral intake port 112 configured to co-operate with the peripheral wall to introduce a rotating flow of a gaseous intake stream comprising a gas component and a non-gas component along an inside surface 114 of the peripheral wall 104.

Also in this embodiment, the separator 100 includes a peripheral exhaust port 116 defined through the peripheral wall 104, configured to divert a radially outermost portion of the rotating flow comprising at least some of the non-gas component to exit the chamber.

In this embodiment, the separator 100 further includes a gas component output port 120, configured to allow the gas component to be drawn from an axially central volume of the separation chamber.

In this embodiment, all of the components of the separation chamber 102 are fabricated from metal, specifically aluminum. Alternatively, however, virtually any rigid material, such as other metals, polycarbonate or other plastic, wood or plywood for example, may be substituted. For embodiments in which the non-gas component includes liquid, the separation chamber 102 is preferably composed of water-impermeable, non-oxidizing materials.

Illustrative Application

In this embodiment, the gas component of the gaseous intake stream includes air and the non-gas component of the gaseous intake stream includes a solid, or more particularly, solid particulate material. More particularly still, in this embodiment the non-gas component includes plant-based materials such as sawdust, wood particles and leaf material, whether wet or dry, which the separator is configured and tuned to remove from the air. Alternatively, the present embodiment and other embodiments may be equally useful for removing other solids, liquids, or both, from air or other gaseous streams.

Chamber

In this embodiment, the central axis 106 of the separation chamber 102 is horizontal. In this regard, unlike Thien and vertical cyclonic separators, the centrifugal gas separator 100 of the present embodiment does not rely upon gravity for axial settling of solids, and thus the separator 100 can be horizontally oriented, if desired. Alternatively, the separation chamber 102 may be oriented with its central axis 106 in any other direction, including vertical for example.

Still referring to FIGS. 1-3, in this embodiment, the peripheral wall 104 is cylindrical. More particularly, in this embodiment the peripheral wall 104 includes first and second discrete wall segments 122 and 124, respectively. In this embodiment, the first wall segment 122 extends along a first arcuate path centred about the axis 106 of the chamber 102 from a downstream side 126 of the peripheral intake port 112 to an upstream side 128 of the peripheral exhaust port 116. Also in this embodiment, the second wall segment 124 extends along a second arcuate path centred about the axis 106 of the chamber 102, from an upstream end 130 of the second wall segment 124 which marks the downstream side of the peripheral exhaust port 116, to a downstream end 132 of the second wall segment 124 which marks the upstream side of the peripheral intake port 112.

In this embodiment, a radius of curvature of the first arcuate path of the first wall segment 122 is equal to a radius of curvature of the second arcuate path of the second wall segment 124. Accordingly, the first and second wall segments 122 and 124 co-operate to form a single cylindrical peripheral wall 104, having the peripheral intake port 112 and the peripheral exhaust port 116 defined therethrough.

Peripheral Intake and Exhaust Ports

Referring to FIGS. 1 and 3, in this embodiment the first wall segment 122 of the peripheral wall 104 includes first and second planar tangential extensions 134 and 136 at opposite ends thereof.

More particularly, in this embodiment the first planar tangential extension 134 extends in an upstream direction from an upstream end of the first arcuate path of the first wall segment 122, in a plane that is tangential to the first arcuate path at the upstream end of the first arcuate path. In this embodiment, the upstream end of the first arcuate path of the first wall segment 122 is defined by the downstream side 126 of the peripheral intake port 112.

Similarly, in this embodiment the second planar tangential extension 136 extends in a downstream direction from a downstream end of the first arcuate path of the first wall segment 122, in a plane that is tangential to the first arcuate path at the downstream end of the first arcuate path. In this embodiment, the downstream end of the first arcuate path of the first wall segment 122 is defined by the upstream side 128 of the peripheral exhaust port 116.

In this embodiment, the peripheral intake port 112 is defined through the peripheral wall 104. More particularly, in this embodiment the peripheral intake port 112 includes an opening defined between the first planar tangential extension 134 of the first wall segment 122 and the downstream end 132 of the second wall segment 124.

Similarly, in this embodiment the peripheral exhaust port 116 includes an opening defined between the second planar extension 136 of the first wall segment 122 and the upstream end 130 of the second wall segment 124.

Still referring to FIGS. 1 and 3, in this embodiment, the peripheral exhaust port 116 includes a tangential exhaust port configured to divert the radially outermost portion of the rotating flow to exit the separation chamber 102 in a direction tangential to the rotating flow at a location of the tangential exhaust port. In this regard, when the gaseous intake stream is introduced through the peripheral intake port 112, the flow rotates around the inside surface 114 of the peripheral wall 104, in a clockwise direction as shown in FIGS. 1-3. As the rotating flow reaches the second planar extension 136, centrifugal force (as well as a possible contribution from the Coanda effect) causes the radially outermost portion of the rotating flow, which contains at least some of the non-gas component, to flow in a direction along the surface of the second planar extension 136 that is tangential to the path of the first arcuate path of the first wall segment 122 at the location of the upstream side 128 of the peripheral exhaust port 116. In this embodiment, after initially travelling in this tangential direction along the second planar extension 136 to effectively exit the separation chamber 102 defined by the peripheral wall 104, the radially outermost portion of the flow is redirected by a guide 138 to exit the separator 100 through a collection port 140, which in this embodiment includes a rectangular space defined between the second planar extension 136 and a top housing portion 142 of the separator.

In this embodiment, the first arcuate path of the first wall segment 122 (which extends from the downstream side 126 of the peripheral intake port 112 to the upstream side 128 of the peripheral exhaust port 116) is longer than the second arcuate path of the second wall segment 124 (from the upstream end 130 to the downstream end 132 of the second wall segment 124). Consequently, as the gaseous intake stream is introduced, it will travel most of the way around the separation chamber 102 before first encountering the peripheral exhaust port 116, allowing sufficient time for centrifugal force to urge most of the airborne solids (or more generally the non-gas component) against the inside surface 114 of the first wall segment 122 of the peripheral wall 104 before they reach the exhaust port. Advantageously, the combination of this feature with the peripheral and tangential nature of the peripheral exhaust port 116 allows a significant percentage of the non-gas component particles to be separated from the gas component on their very first rotation around the separation chamber 102, with most particles being removed within only a few rotations, in contrast with conventional Thien and cyclonic separators which typically require many rotations to allow for their gradual axial settling processes.

Gas Component Output Port and Vacuum

Figure 4:
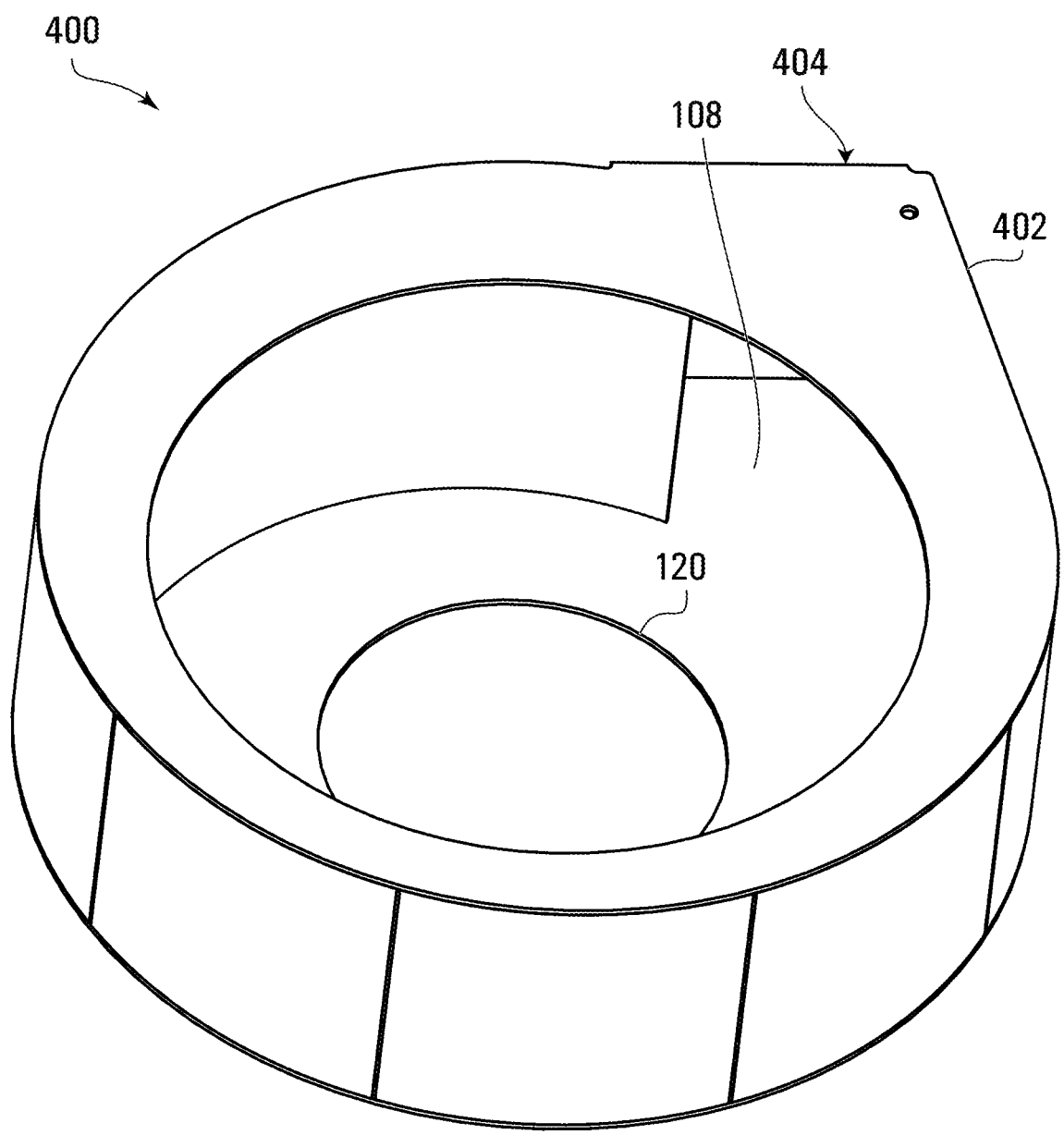
FIG. 4 is an inclined lower-left side view of a vacuum housing of the vacuum of FIG. 1.

Referring to FIGS. 2 and 4, in this embodiment the centrifugal gas separator 100 includes a vacuum 400 in direct communication with the axially central volume of the separation chamber 102 via the gas component output port 120. A novel vacuum housing 402 is shown in greater detail in FIG. 4, although other components of the vacuum are omitted from the drawings for ease of illustration.

As noted above, in this embodiment the gas component output port 120 is configured to allow the gas component to be drawn from an axially central volume of the separation chamber 102. In this regard, the term "axially central volume" is intended to mean the portion of the volume of the chamber that is closer to the central axis 106 than to the peripheral wall 104. The present inventors have found that drawing the gas component from within a radial distance from the central axis that is less than half of the radius of the peripheral wall tends to avoid inadvertently drawing the non-gas component, whereas drawing the gas component from a radial distance of more than half of the radius of the peripheral wall tends to result in some of the non-gas component being inadvertently drawn out of the separator along with the gas component.

In this embodiment, the gas component output port 120 is defined through one of the ends 108 and 110 of the chamber 102 within an axially central area thereof, and the one end of the chamber 102 also includes a sidewall of the vacuum housing 402 for the vacuum 400. In this regard, in this embodiment the ends 108 and 110 of the centrifugal gas separator 100 include a left-side end 108 and a right-side end 110, respectively and the left-side end 108 of the separator 100 also serves as a right-side end of the vacuum housing 402. In this embodiment, the gas component output port 120 includes a circular hole defined through the left side end 108, centred about the axis 106. Alternatively, the gas component output port 120 need not be centred about the axis 106, as long as it is located somewhere within an axially central area of the end 108 (within half the radius of the peripheral wall 104) so as to draw the gas component from somewhere within the axially central volume of the separation chamber 102. In the present embodiment, the end 108 is permanently connected to the remainder of the vacuum housing 402 and is removably connected to the remainder of the separator 100, which facilitates cleaning of the separator 100. Alternatively, if desired, the left-side end of the separator and the right-side end of the vacuum housing may include different respective components. Consequently, in various embodiments, the centrifugal gas separator 100 may be provided either alone, or as part of a separator system that includes the vacuum 400, a receptacle 500, or both. In this embodiment, the separator 100 is provided as part of a single system that includes both the vacuum 400 and the receptacle 500.

Referring to FIGS. 2 and 4, in this embodiment the vacuum housing 402 is sealed on its left side by additional structure (not shown) including a mounting plate having a motor on its left side, a motor axle extending through the plate, and a fan mounted to the motor axle on the right side of the plate. Thus, when the vacuum 400 is assembled, the vacuum housing 402 has two openings, namely, the gas component output port 120 of the left-side end 108 of the separator 100, and an exhaust vent 404. In operation, the motor rotates the fan within the enclosed vacuum housing 402, thus pulling air from the separation chamber 102 into the vacuum housing 402 through the gas component output port 120 and thereby pulling the gaseous intake stream into the separation chamber 102 through the peripheral intake port 112, while simultaneously pushing air out of the housing through the exhaust vent 404. Alternatively, any other type of vacuum may be substituted to draw the gas component out of the separation chamber 102 through the gas component output port 120. In this embodiment, the fan motor includes a 3 horsepower electric motor, which drives the fan to draw air through the separation chamber 102 at a flow rate of about 1200 cubic feet per minute (CFM). More generally, however, the motor and fan are fully scalable to larger or smaller separation chambers. For a given separation chamber, increasing the flow rate and thus the rotation speed of the flow within the separation chamber tends to improve the effectiveness of the separation chamber at filtering smaller particles.

As noted above, in this embodiment the vacuum 400 housed by the vacuum housing 402 is in direct communication with the axially central volume of the separation chamber 102, via the gas component output port 120. This configuration avoids the need for hoses or tubing to place the separator 100 and the vacuum 400 in communication with each other, which advantageously tends to reduce both the static pressure loss of the separator 100 and the required size "footprint" of the separator-vacuum system. Reducing the static pressure loss of the separator 100 advantageously tends to increase both volumetric flow rates and energy efficiency of the separator 100.

In this embodiment, the vacuum housing 402 is composed of the same material as the separation chamber 102, which in this embodiment includes aluminum.

Tuning

In this embodiment, an area of the peripheral intake port 112 and an area of the gas component output port 120 are approximately equal. More particularly, in this embodiment the gas component output port 120 is a circular opening with a diameter of about 8 inches and thus an area of about 50 square inches, and the peripheral intake port 112 is a rectangular opening with a similar area of about 50 square inches. Generally, it is preferable for the peripheral intake port 112 to have an area greater than or equal to the area of the gas component output port 120, so that the peripheral intake port 112 does not restrict the flow rate at which the fan draws air out of the separation chamber 102 through the gas component output port 120.

Various parameters of the system can be tuned. For example, the area of the peripheral exhaust port 116 may be varied if desired. Generally, a larger peripheral exhaust port is capable of removing larger particles, but enlarging the peripheral exhaust port also tends to reduce the volumetric air flow rate through the separator 100, which reduces the efficiency of the separator in removing smaller particles. Generally, the present inventors have found that it is preferable for the peripheral exhaust port 116 to be as radially narrow as possible, just large enough for the largest particles of the non-gas component of the rotating flow to successfully exit the chamber 102. If the peripheral exhaust port 116 is larger than necessary for this purpose, the volumetric flow rates and separation rates tend to be unnecessarily diminished.

Receptacle

Figure 5:
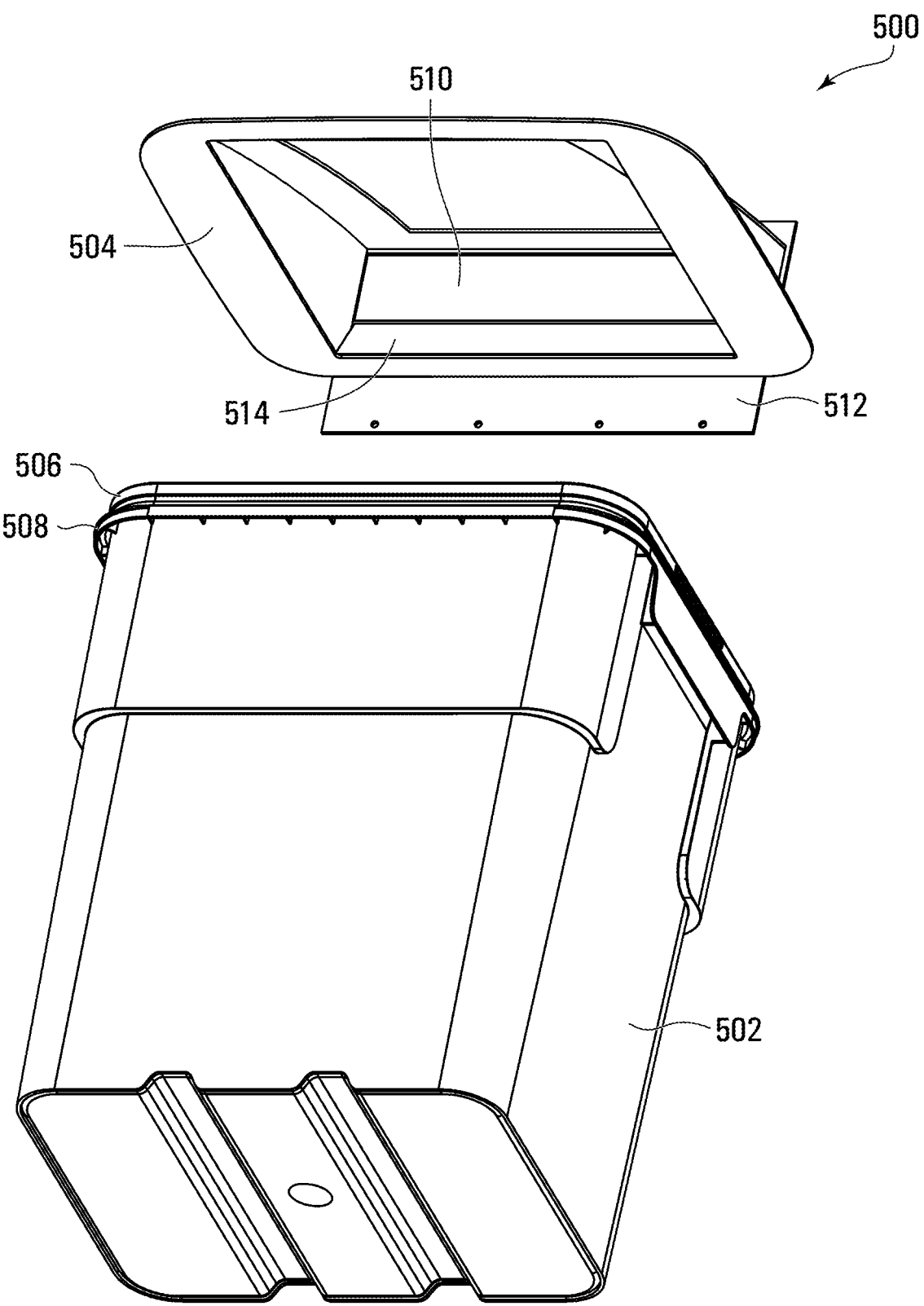
FIG. 5 is an inclined lower-front-right view of the collection receptacle of FIG. 1.

Referring to FIGS. 2, 3 and 5, in this embodiment the centrifugal gas separator 100 further includes a non-gas component collection receptacle 500, in direct communication with the peripheral exhaust port 116.

More particularly, in this embodiment the collection receptacle 500 includes a container 502, a lid 504 and a seal 506 configured to seal the lid 504 to the container 502 to maintain an internal gas pressure of the collection receptacle 500 equal to a gas pressure inside the separation chamber 102.

More particularly still, in this embodiment the container 502 includes a standard plastic pail having an upper opening with a shape that is complementary to the shape of the lid 504, which is also composed of plastic. In this embodiment, the seal 506 includes a compressible gasket seal, which compresses and deforms to provide an air-tight and liquid-tight seal between the container 502 and the lid 504. In this embodiment, the lid 504 is further equipped with a plurality of manual spring clamps (not shown), each of which engages with an upper rim 508 of the container 502 to seal the lid 504 to the container 502 in an air-tight and liquid-tight fashion. Alternatively, other ways of compressing the seal 506, or more generally other ways of sealing the receptacle 500, may be substituted.

Consequently, during operation, the gas pressure within the internal volume of the collection receptacle 500 is maintained at the same as the gas pressure within the internal volume of the separation chamber 102. In this regard, the present inventors have found that the separation chamber 102 easily delivers the non-gas component into the collection receptacle 500 when the container 502 is sealed tightly to the lid 504. However, if the lid 504 is not tightly sealed to the container 502, then the vacuum (negative pressure) inside the separation chamber 102 tends to pull air in from the collection receptacle 500, thereby tending to pull separated solids or other separated non-gas component materials in the wrong direction, back into the separation chamber 102.

In this embodiment, the lid 504 has an intake opening 510 which extends through the lid and through a mounting plate 512, which in this embodiment is used to secure the collection receptacle 500 to the separator 100. In this embodiment, the intake opening 510 of the collection receptacle 500 has the same rectangular shape and size as the collection port 140 of the separator 100, and the mounting plate 512 aligns the intake opening 510 and the collection port 140 when the receptacle 500 is mounted to the separator 100.

During operation of the separator 100, the seal 506 tightly seals the lid 504 to the container 502, so that the intake opening 510 is the only opening into the container 502.

In this embodiment the lid 504 of the collection receptacle 500 further includes an inlet ramp 514. In this regard, the present inventors have found that the inlet ramp 514 tends to reduce the likelihood of particulate matter or other non-gas component material accumulating and creating a blockage in the vicinity of the intake opening 510.

Operation

Referring to FIGS. 1-3, the process of separating the gas component from the non-gas component of a gaseous intake stream begins by introducing the gaseous intake stream into the centrifugal gas separator 100.

More particularly, in this embodiment this first aspect of the process involves introducing a rotating flow of the gaseous intake stream, including the gas component and the non-gas component, along the inside surface 114 of the peripheral wall 104 of the separation chamber 102, through the peripheral intake port 112 defined through the peripheral wall 104, the peripheral wall extending around the central axis 106 of the chamber and extending axially between opposite ends 108 and 110 of the chamber.

To achieve this, in this embodiment the vacuum 400 is activated, to begin drawing air out of the separation chamber 102 and into the vacuum housing 402, via the gas component output port 120, and the gas pressure within the separation chamber 102 therefore drops. The seal between the lid 504 and the container 502 of the collection receptacle 500 is maintained in an airtight configuration during operation, and therefore, air cannot be drawn into the separation chamber 102 via the peripheral exhaust port 116 in response to the application of the vacuum to the separation chamber 102. The only other unsealed opening to the separation chamber 102 is the peripheral intake port 112. Accordingly, the activation of the vacuum 400 causes air to be drawn into the separation chamber 102 via the peripheral intake port 112, to replenish the air that is being drawn out of the separation chamber 102 through the gas component output port 120 by the vacuum 400.

In this embodiment, it is the air drawn into the separation chamber 102 through the peripheral intake port 112 that constitutes the gaseous intake stream that is to be separated into its gas component and non-gas component. In some embodiments, this intake stream enters the peripheral intake port 112 directly without any additional conduits. For example, no such conduits would be required if the separator 100 is being used to remove solids from the ambient air, such as sawdust in a woodworking shop or sawmill, nor would any conduit be required if the peripheral intake port 112 is effectively being used as a suction device. As an example of the latter, in the harvesting of hops or medical marijuana, the peripheral intake port 112 may be placed in close proximity to a tumbler that is rotating in the presence of a spinning cutting reel, to thereby draw in a gaseous intake stream that includes air and airborne leaf trimmings. Advantageously, in such an application of the separator 100, the separator 100 needs no piping, hosing or other conduits for either intake of the gaseous stream or for output of the gas component and non-gas component. Advantageously, such a separator tends to have a lower static pressure drop, which tends to result in higher volumetric flow rates and energy efficiency, than separators that require such conduits. Alternatively, if desired, the peripheral intake port 112 can be provided with a suitable conduit, such as hosing, piping or tubing, to draw a gaseous intake stream from another source.

In this embodiment, the power of the vacuum 400 and the matched sizes of the peripheral intake port 112 and gas component output port 120 result in the gaseous intake stream being drawn into the separation chamber 102 at a significant velocity, initially in a direction parallel to the first planar tangential extension 134. As the gaseous intake stream passes the extension 134 it begins to travel along the inside surface 114 of the first wall segment 122 of the peripheral wall 104. As the first wall segment 122 curves along its arcuate path, its inside surface 114 applies a radially inward centripetal force, to continually redirect the gaseous stream to continue rotating around the inside surface 114 of the peripheral wall 104, in a clockwise direction as shown in FIG. 1. Within the gaseous intake stream rotating along the inside surface 114 of the peripheral wall 104, the resulting centrifugal force urges the non-gas component (in this case solid particles) radially outward against the inside surface 114 to a greater extent than the gas component, due to the greater density of the non-gas component. The velocity of the gaseous intake stream is sufficiently high that the radially outward centrifugal force applied to the non-gas component significantly exceeds the force of gravity acting on the non-gas component, so even as the rotating stream rotates along the second wall segment 124 near the top of the chamber 102, the non-gas component continues to be urged against the inside surface 114 of the peripheral wall 104. Consequently, the non-gas component tends to migrate to and then remain within the radially outermost portion of the rotating flow, immediately inside and pressing against the inside surface 114, as the rotating flow rotates around the inside surface 114.

In this embodiment, the process then includes diverting the radially outermost portion of the rotating flow, including at least some of the non-gas component, to exit the chamber through the peripheral exhaust port 116 defined through the peripheral wall 104 of the chamber.

In this regard, as the rotating flow continues along the first wall segment 122 and reaches the upstream side 128 of the peripheral exhaust port 116, the first arcuate path of the first wall segment 122 terminates and the first wall segment 122 ends with the second tangential extension 136, which extends in a linear direction tangential to the curvature of the first wall segment 122 at the upstream side 128 of the peripheral exhaust port 116. Centrifugal force continues to urge much of the non-gas component materials radially outward against the second tangential extension 136, and thus the non-gas component materials tend to follow the path of the extension 136, until the radially outermost portion of the flow is redirected by the guide 138 to exit the separator 100 through the collection port 140 and thus enter the collection receptacle 500 via its intake opening 510.

Typically, not all of the non-gas component will exit the separation chamber on the first rotation. Smaller particles may be more prone to multiple rotations than larger particles. Nevertheless, in an embodiment in which the gas component is air and the non-gas component includes dried plant dust and leaves, for example, most of the non-gas component tends to exit the separation chamber 102 and be deposited into the receptacle 500 within the first few rotations around the chamber 102. Advantageously, therefore, the settling time for the non-gas component tends to be much faster in the present embodiment than with conventional Thien or cyclonic separators, and the present embodiment is also capable of accepting gaseous intake streams with significantly higher non-gas component concentrations than such conventional separators.

In this embodiment, the process further includes allowing the gas component to be drawn from the axially central volume of the separation chamber 102. This aspect begins at the very outset of the process, when the vacuum 400 is first activated in order to begin drawing the gaseous intake stream into the separation chamber 102. During operation, the vacuum 400 continues to draw the gas component, which in this embodiment is air, from the axially central volume of the separation chamber 102. Due to the radially outward centrifugal force being applied to the rotating flow of the gaseous intake stream, the axially central volume of the separation chamber 102, which it will be recalled includes an axially centred region extending for half the radius of the peripheral wall, remains largely devoid of the non-gas component, or at least of non-gas component particles larger than the separator's "cut point" which defines the smallest particle that is removed by the separator with 50% or greater efficiency. In this embodiment, the separation chamber 102 tends to successfully remove all particles large enough to be seen with the naked eye, and thus the cut point corresponds to a microscopic particle size too small to be seen without technological assistance.

Accordingly, during operation of the separator 100, the vacuum 400 continually draws the gas component (in this case air) from the axially central volume of the separation chamber 102 via the gas component output port 120, and vents it via the vent 404, thereby maintaining a negative pressure inside the separation chamber 102, which continually draws in the gaseous intake stream via the peripheral intake port 112 to replenish the air drawn out by the vacuum 400 through the gas component output port 120.

Alternatives

Figure 6:
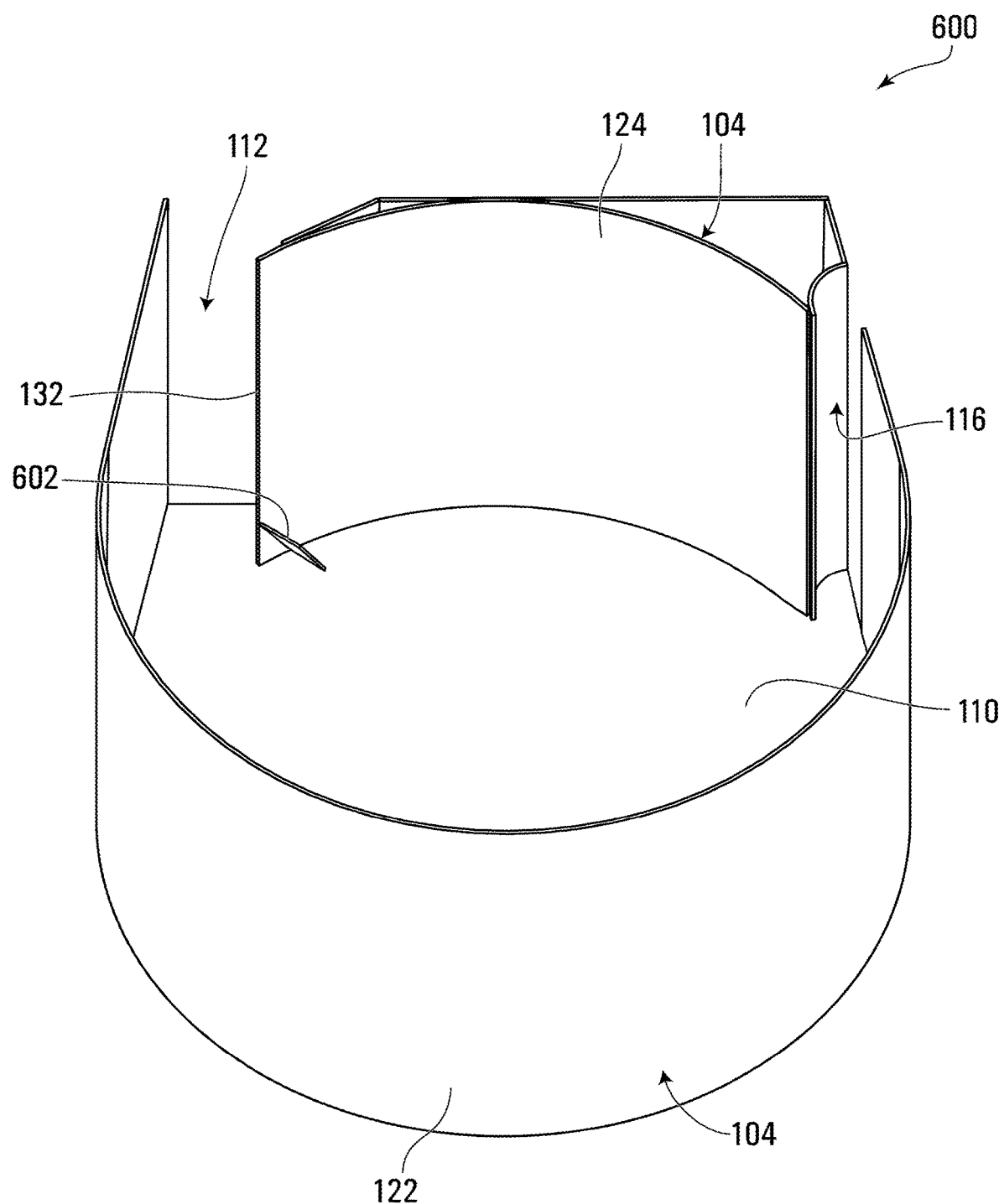
FIG. 6 is an inclined left-side view of a centrifugal separator according to a second embodiment of the invention, with a left sidewall removed.

Referring to FIGS. 1 and 6, a centrifugal gas separator for separating gas and non-gas components of a gaseous stream, according to a second embodiment of the invention, is shown generally at 600.

In this embodiment, the separator 600 includes all of the features of the separator 100 described above, and additionally includes a ramp 602 extending from the peripheral wall 104 and from a side wall of the separation chamber. More particularly, in this embodiment the side wall includes the end 110 of the chamber, which in the present embodiment is a solid aluminum side wall.

In this embodiment, the ramp 602 has a rectangular planar shape. More particularly, in this embodiment the ramp 602 has a square planar shape, and extends from the second wall segment 124 of the peripheral wall 104 and from the end 110, in a direction having both radially inward and axially inward components. In this embodiment, the ramp 602 is inclined, so that a normal to the plane of the ramp 602 is inclined about 45 degrees relative to the central axis 106, with its axially innermost edge being disposed further downstream (counterclockwise in FIG. 6) than its axially outermost edge which abuts the end 110.

Advantageously, the present inventors have empirically found that the presence of such a ramp tends to decrease the average dwell time of the non-gas component within the separation chamber 102 before exiting into the collection receptacle 500. During operation, some of the non-gas component may tend to migrate toward the end 110 as it rotates in the separation chamber 102; to the extent that this occurs, the ramp 602 redirects the axially outmost component of the rotating flow adjacent the end 110 to impart it with an axially inward velocity component, thus redirecting the non-gas component back into the main rotating flow and tending to result in faster removal of the non-gas component over fewer rotations around the separation chamber.

Figure 7:
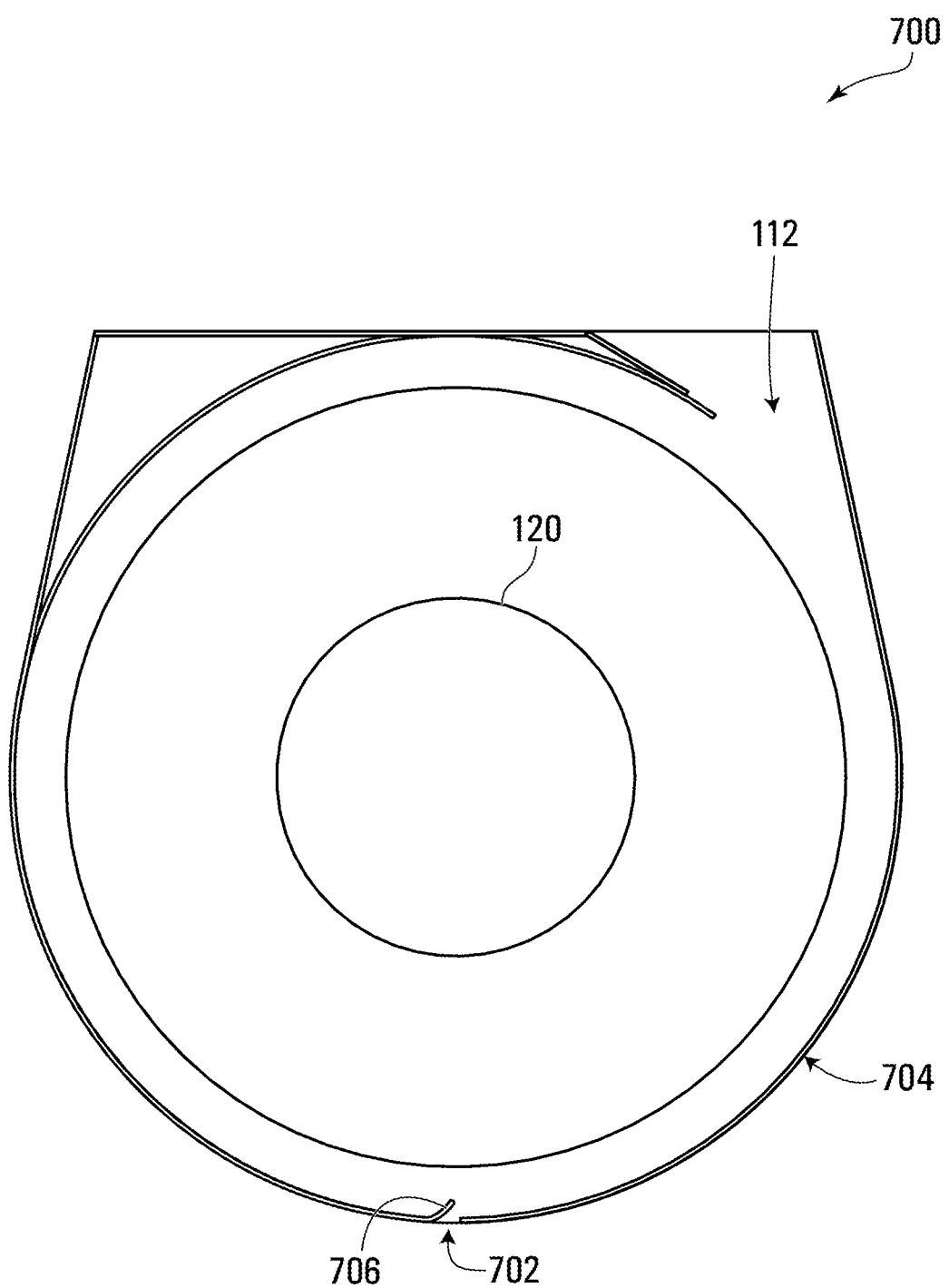
FIG. 7 is a right-side elevation view of a centrifugal separator according to a third embodiment of the invention, with a right sidewall removed.

Referring to FIGS. 1 and 7, a centrifugal gas separator for separating gas and non-gas components of a gaseous stream, according to a third embodiment of the invention, is shown generally at 700.

In this embodiment, the peripheral exhaust port 116 has been removed and replaced with a differently located peripheral exhaust port 702. In this embodiment the peripheral exhaust port 702 is disposed at a bottom of a peripheral wall 704, but in alternative embodiments, the peripheral exhaust port 702 may be defined through the peripheral wall 704 at any other location around its circumference. The peripheral wall 704 is identical to the peripheral wall 104 except for the location, shape and dimensions of the gap that defines the peripheral exhaust port. In this embodiment, the peripheral exhaust port 702 consists of a simple rectangular gap defined through the peripheral wall 104 of the separator 700.

In this embodiment, the separator 700 includes a diverter 706 extending from the peripheral wall 104 in a direction having a radially inward component and configured to co-operate with the peripheral exhaust port to redirect the radially outermost portion of the rotating flow to exit the chamber. As the gaseous stream rotates in a clockwise direction as shown in FIG. 6, centrifugal force urges the non-gas component radially outward against an inside surface of the peripheral wall 704. Thus, as the radially outermost portion of the rotating flow reaches the location of the diverter 706, airborne solids or other non-gas components will either strike the diverter 706 and be deflected downwards through the peripheral exhaust port 702, or will be carried through the peripheral exhaust port 702 by the radially outermost gas flow as it strikes the diverter 706.

In this embodiment, the collection receptacle 500 is replaced with a differently shaped container (not shown), shaped with an arcuate upper surface that facilitates a tight seal between the container and the arcuate bottom surface of the separator 700. As with the previous embodiments, the container is tightly sealed during operation, so that the peripheral exhaust port 702 provides the only opening into the container.

In addition to the embodiments described above, it is contemplated that any one or more features of any particular embodiment may be combined with any one or more features of any other embodiment, except where such features have been described as mutually exclusive alternatives.

More generally, while specific embodiments of the invention have been described and illustrated, such embodiments should be considered illustrative of the invention only and not as limiting the invention as defined by the accompanying claims.

What is claimed is:

1. A centrifugal gas separator for separating gas and non-gas components of a gaseous stream, the separator comprising:
   a centrifugal separation chamber defined by a peripheral wall spaced apart from and extending around a central axis of the chamber, the peripheral wall extending axially between spaced apart side walls disposed at axially opposite ends of the chamber;
   a peripheral intake port configured to co-operate with the peripheral wall to introduce a rotating flow of a gaseous intake stream comprising a gas component and a non-gas component along an inside surface of the peripheral wall;
   a peripheral exhaust port defined through the peripheral wall, configured to divert a radially outermost portion of the rotating flow comprising at least some of the non-gas component to exit the chamber;
   a gas component output port, configured to allow the gas component to be drawn from an axially central volume of the separation chamber; and
   a ramp extending from the peripheral wall and from one of the side walls disposed at one of the axially opposite ends of the separation chamber wherein the ramp is inclined to redirect an axially outmost component of the rotating flow adjacent the one of the side walls from which the ramp extends, to impart the axially outmost component of the rotating flow with an axially inward velocity component.

2. The centrifugal gas separator of claim 1, wherein the peripheral exhaust port comprises a tangential exhaust port configured to divert the radially outermost portion of the rotating flow to exit the chamber in a direction tangential to the rotating flow at a location of the tangential exhaust port.

3. The centrifugal gas separator of claim 1, wherein the peripheral intake port is defined through the peripheral wall.

4. The centrifugal gas separator of claim 1 wherein the peripheral wall is cylindrical.

5. The centrifugal gas separator of claim 1, wherein:
   the peripheral wall comprises first and second discrete wall segments;
   the first wall segment extends along a first arcuate path centered about the axis of the chamber from a downstream side of the peripheral intake port to an upstream side of the peripheral exhaust port; and
   the second wall segment extends along a second arcuate path centered about the axis of the chamber from a downstream side of the peripheral exhaust port to an upstream side of the peripheral intake port.

6. The centrifugal gas separator of claim 5, wherein a radius of curvature of the first arcuate path of the first wall segment is equal to a radius of curvature of the second arcuate path of the second wall segment.

7. The centrifugal gas separator of claim 5, wherein the first arcuate path is longer than the second arcuate path.

8. The centrifugal gas separator of claim 5, wherein:
   the first wall segment of the peripheral wall comprises first and second planar tangential extensions at opposite ends thereof,
   wherein the first planar tangential extension extends in an upstream direction from an upstream end of the first arcuate path, in a plane that is tangential to the first arcuate path at the upstream end of the first arcuate path; and
   wherein the second planar tangential extension extends in a downstream direction from a downstream end of the first arcuate path, in a plane that is tangential to the first arcuate path at the downstream end of the first arcuate path.

9. The centrifugal gas separator of claim 8, wherein the peripheral intake port comprises an opening defined between the first planar tangential extension of the first wall segment and a downstream end of the second wall segment.

10. The centrifugal gas separator of claim 8, wherein the peripheral exhaust port comprises an opening defined between the second planar extension of the first wall segment and an upstream end of the second wall segment.

11. The centrifugal gas separator of claim 1 further comprising a non-gas component collection receptacle in direct communication with the peripheral exhaust port.

12. The centrifugal gas separator of claim 11, wherein the collection receptacle is configured to maintain an internal gas pressure of the receptacle equal to a gas pressure inside the separation chamber.

13. The centrifugal gas separator of claim 11, wherein the collection receptacle comprises a container, a lid and a seal configured to seal the lid to the container to maintain an internal gas pressure of the collection receptacle equal to a gas pressure inside the separation chamber.

14. The centrifugal gas separator of claim 1 further comprising a diverter extending from the peripheral wall in a direction having a radially inward component and configured to co-operate with the peripheral exhaust port to redirect the radially outermost portion of the rotating flow to exit the chamber.

15. The centrifugal gas separator of claim 1, wherein an area of the peripheral intake port and an area of the gas component output port are approximately equal.

16. The centrifugal gas separator of claim 1, wherein the central axis of the chamber is horizontal.

17. The centrifugal gas separator of claim 1, wherein the gas component comprises air and the non-gas component comprises solid particulate material.

18. The centrifugal gas separator of claim 1, further comprising a vacuum in direct communication with the axially central volume of the separation chamber via the gas component output port.

19. The centrifugal gas separator of claim 18, wherein the gas component output port is defined through one of the ends of the chamber within an axially central area thereof.

20. The centrifugal gas separator of claim 19, wherein the one end of the chamber through which the gas component output port is defined includes a sidewall of a vacuum housing for the vacuum.

21. A centrifugal gas separator comprising:

means for introducing a rotating flow of a gaseous intake stream comprising a gas component and a non-gas component along an inside surface of a peripheral wall of a centrifugal separation chamber, the peripheral wall extending around a central axis of the chamber and extending axially between side walls disposed at axially opposite ends of the chamber;

means for diverting a radially outermost portion of the rotating flow, including at least some of the non-gas component, to exit the chamber through the peripheral wall of the chamber;

means for allowing the gas component to be drawn from an axially central volume of the separation chamber; and means for redirecting an axially outmost component of the rotating flow adjacent one of the side walls disposed at one of the axially opposite ends of the chamber, to impart the axially outmost component of the rotating flow with an axially inward velocity component.

* * * * *